Dec. 13, 1955  M. A. EDWARDS  2,727,201
MOTOR CONTROL SYSTEM
Filed July 29, 1952  3 Sheets-Sheet 1

Inventor:
Martin A. Edwards,
by Charles W. [illegible]
His Attorney.

Dec. 13, 1955 — M. A. EDWARDS — 2,727,201
MOTOR CONTROL SYSTEM
Filed July 29, 1952 — 3 Sheets-Sheet 3
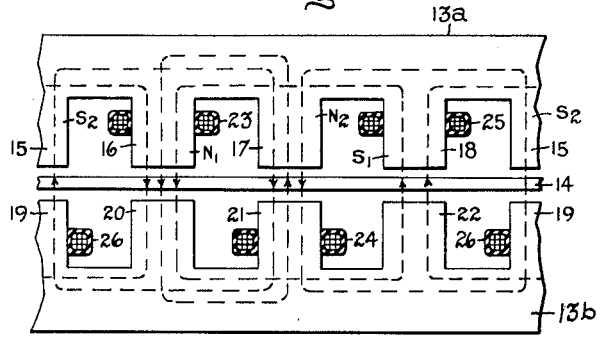
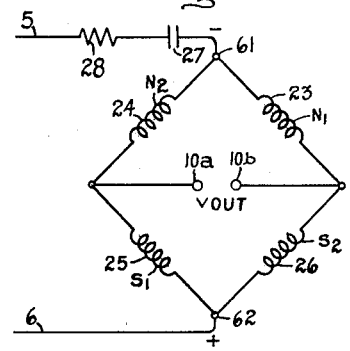
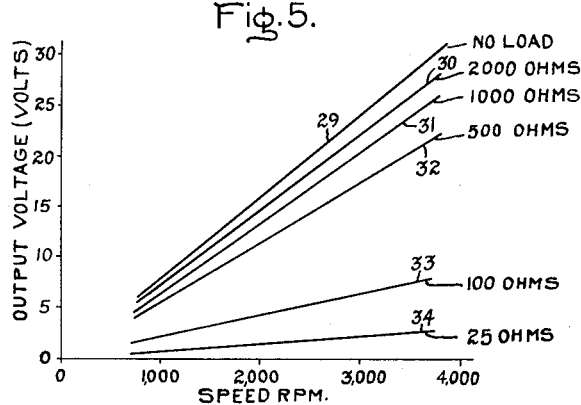
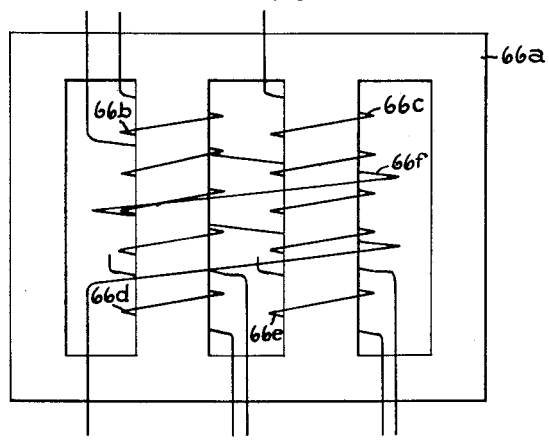
Inventor:
Martin A. Edwards,
by *Clarke W. Neist*
His Attorney.

ns patent office 2,727,201
Patented Dec. 13, 1955

2,727,201

MOTOR CONTROL SYSTEM

Martin A. Edwards, Scotia, N. Y., assignor to General Electric Company, a corporation of New York Application July 29, 1952, Serial No. 301,480

4 Claims. (Cl. 318—317)

This invention relates to control systems, more particularly to control systems for controlling the speed of direct current motors, and it has for an object the provision of a simple, reliable and highly accurate control system of this character.

A further object of this invention is the provision of a control system in which provision is made for comparing with an alternating reference voltage an alternating control voltage of which the magnitude varies with the speed of the motor and the frequency remains constant for all speeds of the motor, and supplying the difference of the two voltages to an amplifier which, in turn, controls a means for varying the speed of the motor.

A still further object of the invention is the provision of a system of this character in which errors in the control voltage resulting from such factors as variations in the voltage of the source from which the reference voltage is derived, variable brush drop, and variable commutator film of the tachometer generator utilized to produce the control voltage are eliminated.

In carrying the invention into effect in one form thereof an alternating reference voltage is derived from a pair of alternating voltage supply terminals. An alternating control voltage of the same frequency and having a magnitude which varies with the speed of the motor is produced by means of an alternating voltage tachometer generator driven by the motor and having a stator winding supplied from the terminals from which the reference voltage is derived. The difference of these two voltages is supplied to an alternating voltage amplifier which, in turn, controls a means for varying the speed of the motor.

Figure 1:
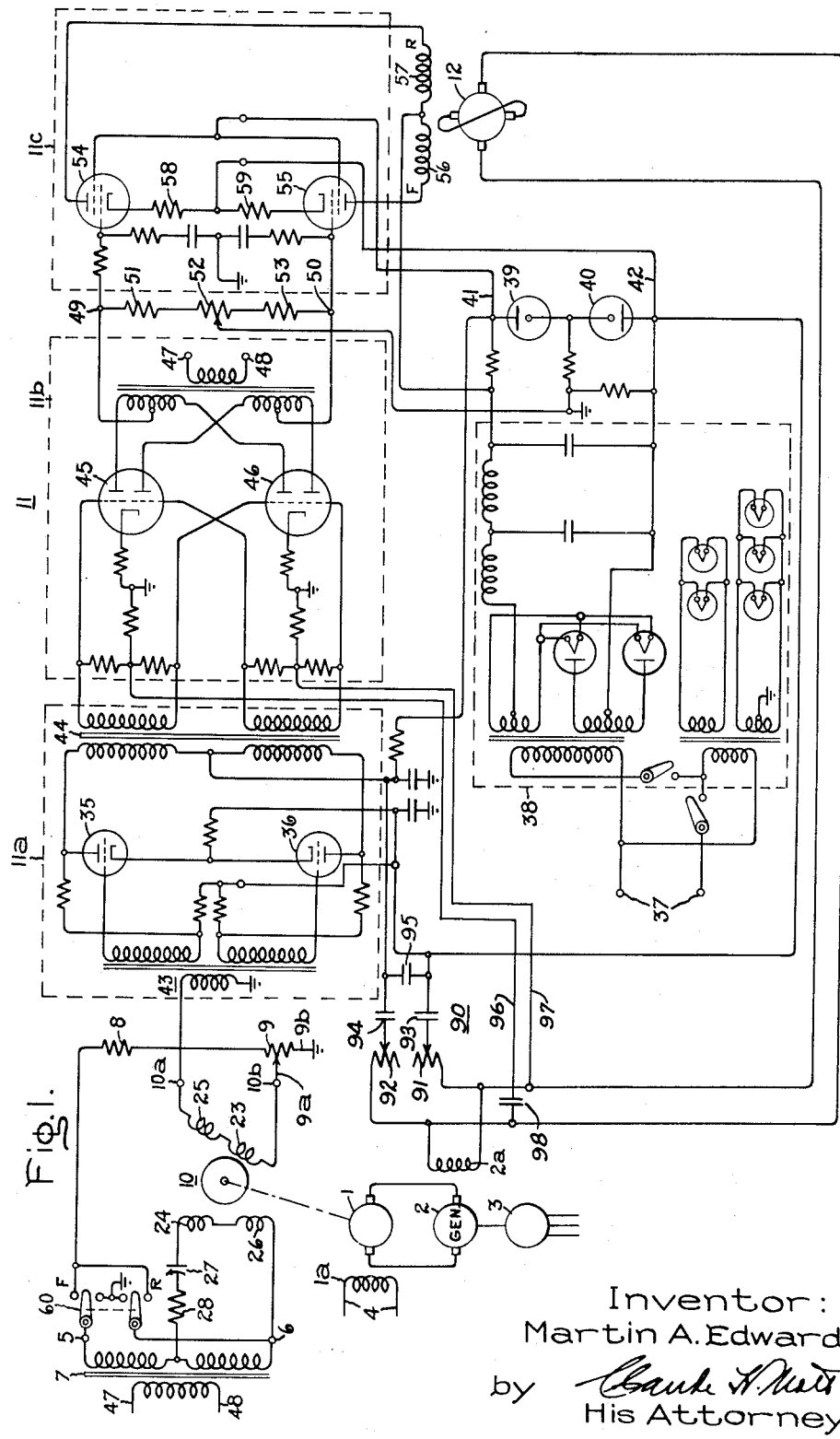
Figure 2:
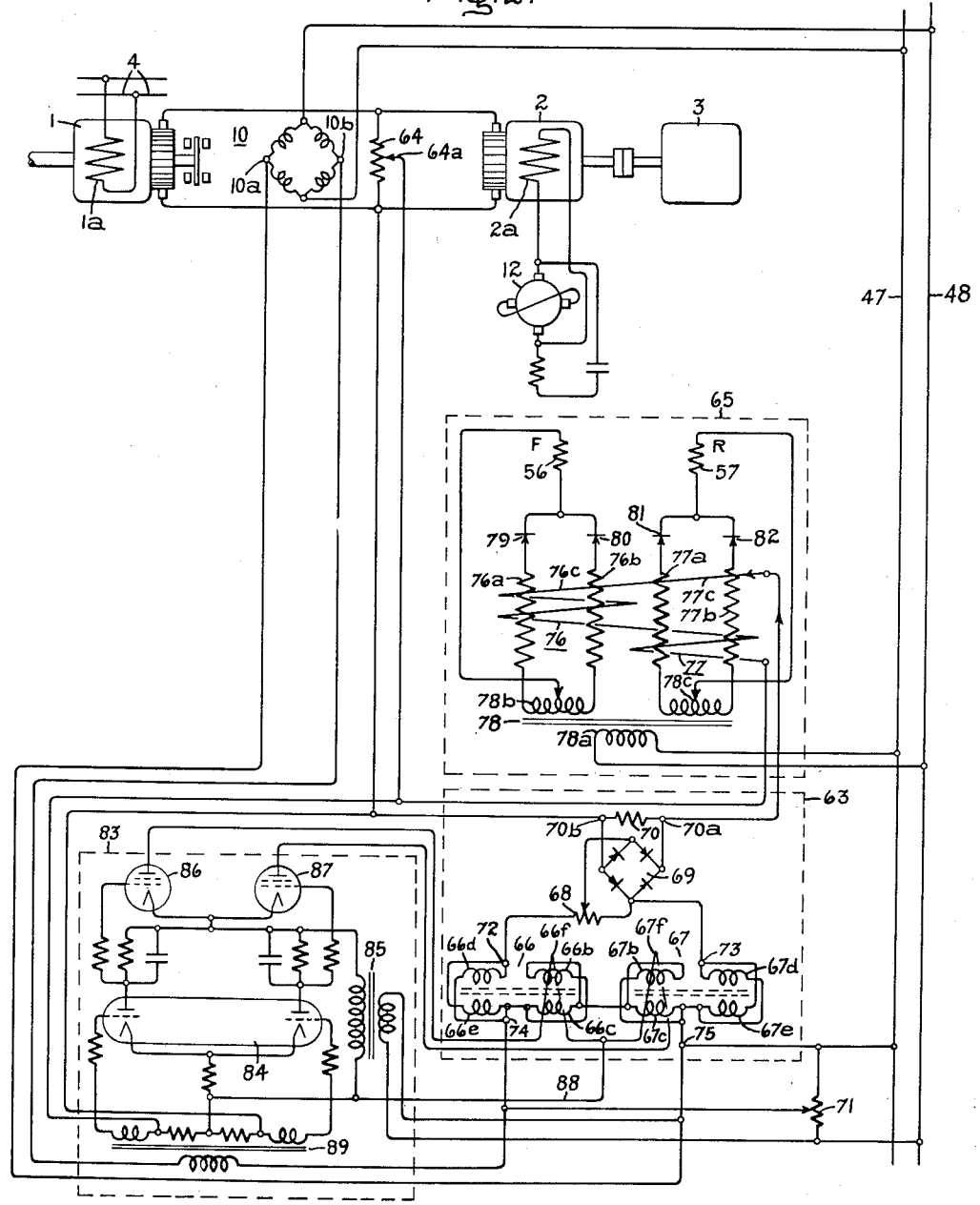

For a better and more complete understanding of the invention, reference should now be had to the following specification and to the accompanying drawings of which Fig. 1 is a simple schematic diagram of an embodiment of the invention; Fig. 2 is a schematic diagram similar to that of Figure 1 and showing a modification; Fig. 3 is a detail fragmental view illustrating the physical arrangement of the tachometer generator used; Fig. 4 is a detail illustrating an alternative electrical connection of the coils of the tachometer generator; Fig. 5 is a chart of characteristic curves of the alternating voltage tachometer generator, and Fig. 6 is an enlargement of a detail of the modification illustrated in Fig. 2.

Referring now to the drawings, a variable speed electric motor 1 is provided for driving a suitable load, such, for example, as a section of a paper-making machine. Its speed is to be adjusted to a desired value corresponding to the magnitude of a standard reference voltage which may be adjusted to any value within a wide range.

Any suitable means may be utilized for varying the speed of the motor. For example, its speed may be varied by varying the strength of its field excitation. However, for many applications it is preferable to maintain the field strength constant and to vary the speed by varying the voltage supplied to its armature as illustrated in Fig. 1 in which the armature of the motor 1 is connected to be supplied from an adjustable voltage generator 2. A motor 3, such as an induction motor, drives the generator 2 at a speed which is preferably substantially constant.

As shown, the motor 1 has a separately excited field winding 1a which is supplied from a suitable substantially constant voltage source such as represented by the two supply terminals 4. Likewise, the generator 2 has a field winding 2a which is excited in response to the difference between an alternating standard reference voltage and an alternating control voltage which is representative of the speed of the motor.

The reference voltage is derived from a suitable source such as the terminals 5 and 6 of the secondary winding of a supply transformer 7 which, in turn, is supplied from a suitable alternating voltage supply line. In this connection, a fixed resistor 8 and a potentiometer 9 are connected in series relationship with each other across the secondary terminals of the transformer. The potentiometer is provided with a movable contact 9a which is usually referred to as the "slider." The voltage which appears between terminal 9b and the slider is the standard reference voltage to which the speed of the motor is to be caused to conform.

For producing an alternating speed reference voltage having a constant frequency for all speeds of the motor and having a magnitude varying with the speed of the motor, an alternating voltage tachometer generator 10 driven by the motor 1 and having a stator winding energized from the alternating voltage supply transformer 7 and provided with output terminals 10a and 10b is provided. For one direction of one rotation of the motor 1, the voltage at the output terminals as taken from terminal 10b to terminal 10a is in phase with the supply voltage and consequently it is in phase with the standard reference voltage. The slider and output terminal 10b are electrically connected together. Consequently, the active portion of the potentiometer and the output terminals 10a and 10b constitute a voltage comparison circuit and the voltage between the output terminal 10a and potentiometer terminal 9b is an alternating voltage equal to the difference of the standard reference voltage and the output voltage of the generator. For the system to operate, the magnitude of the standard reference voltage is set at such a value that the difference between it and the spaced reference voltage has a magnitude at the desired speed of rotation of the motor 1 to cause the motor 1 to operate at that desired speed. This difference voltage is referred to for convenience as the "error voltage."

The "error voltage" is amplified by means of an electronic amplifier 11 and the output voltage of the amplifier is utilized to excite an amplidyne exciter 12 which, in turn, controls the excitation of the supply generator to effect operation of the motor at a speed corresponding to the magnitude of the standard reference voltage.

In Fig. 3, which is a diagrammatic sketch of the stator cores 13a and 13b of the tachometer generator illustrating the polar structure and the disposition of the winding coils thereon, the generator is seen to be an axial air gap machine. It has a solid disk conductor rotor 14 as illustrated both in Figs. 1 and 3. Each of the stator core members is provided with four poles which are directly opposite corresponding poles on the other core. For example, the core 13a is provided with poles 15, 16, 17 and 18 and the core 13b is provided with corresponding axially displaced poles 19, 20, 21 and 22. In the interest of simplicity the stator cores are illustrated as each having but four poles. However, the use of a tachometer generator having a larger number of stator poles is contemplated.

On the stator poles is mounted a winding which is illustrated as comprising four coils 23, 24, 25 and 26. In the embodiment of the invention illustrated in Fig. 1 the coils 24 and 26 are connected in series relationship with each other and a capacitor 27 and resistor 28 across the lower half of the secondary winding of supply transformer 7. The coils 23 and 25 are connected in series relationship with each other to the output terminals 10a and 10b and their axis is 90° displaced from the axis of primary coils 24 and 26.

The disk 14 may be made of any suitable conducting material such, for example, as copper, aluminum or phosphor bronze.

When the rotor is at rest, only eddy currents are induced in the disk by the primary coils 24 and 26. These eddy currents do not induce voltages in the secondary windings. However, if the disk is rotated, alternating voltages of the same frequency as that of the supply terminals 5 and 6 are induced in the disk as a result of cutting the lines of force crossing the air gap and these voltages produce alternating currents in the disk which, in turn, induce voltages in secondary coils 23 and 25 and the sum of these induced voltages appears across the output terminals 10a and 10b of the tachometer generator. The voltage at the output terminals has the same frequency as the voltage of the supply terminals 5 and 6 and its frequency remains constant at this value for all speeds of the disk.

The amplitude of the output voltage varies linearly with the speed of the motor as illustrated in the chart of characteristic curves in Fig. 5 in which the output voltage versus speed characteristic for no load and for loads of 2000 ohms, 1000 ohms, 500 ohms, 100 ohms and 25 ohms are represented by the linear curves 29, 30, 31, 32, 33 and 34, respectively. The phase of the output voltage of the tachometer generator reverses with reversals in direction of rotation of the disk. Thus, for one direction of rotation which may be assumed to correspond to the forward direction of rotation of the motor 1, the output voltage of the tachometer generator is in phase with the supply voltage, and for the reverse direction of rotation of the motor, it is 180° out of phase with the supply voltage.

The amplifier has three stages of which the first is a voltage amplifier 11a, the second is a phase detector and voltage amplifier 11b, and the third is a power amplifier 11c. As shown, the voltage amplifier stage comprises a pair of electric valves 35 and 36 connected in push-pull relationship. Although these valves may be of any suitable type, they are preferably 12AU7 triode valves.

Direct voltage is supplied to the anode-cathode circuits of the valves 35 and 36 from a suitable source of regulated direct voltage which is illustrated as a source of alternating voltage 37, a full wave rectifier and filter combination 38 and a pair of voltage regulator valves 39 and 40 connected in series relationship across the output supply terminals 41 and 42.

Any voltage such as the alternating error voltage which is supplied to the primary winding of the input transformer 43 is amplified and appears as an amplified error voltage at the primary winding terminals of the second stage input transformer 44.

The voltage amplifier and phase detector stage 11b comprises a pair of twin triode electric valves 45 and 46 which are preferably 6N7 valves with each conducting path of each valve connected in push-pull relationship with a corresponding conducting path of the other valve. An alternating voltage is supplied to the anode-cathode circuits of both valves from a suitable source of alternating voltage which is the same source as that from which the primary winding coils of the tachometer generator are supplied and which is represented by the supply lines 47 and 48. For one direction of rotation of the rotor of the tachometer generator which may be assumed to be the forward direction, the amplified error voltage will be in phase with the anode voltage of one half of the valve 45 and the anode voltage of the corresponding conducting path of valve 46 and there will appear across the outside terminals 49 and 50 of the series connected load resistors 51, 52 and 53 a direct voltage of which the magnitude is proportional to the error voltage and the polarity is positive at the terminal 50. For the reverse direction of rotation of the tachometer generator, the error voltage is in phase with the anode voltage of the opposite conducting paths of the valves 45 and 46 and the voltage which appears across the load resistor terminals 49 and 50 will be proportional to the error voltage and positive at the terminal 49.

The power amplifier stage 11c comprises a pair of push-pull connected electric valves 54 and 55 which may be of any suitable type but which are preferably 6L6 valves. As shown the anode-cathode circuits of the valves 54 and 55 are supplied from the regulated direct voltage supply conductors 41 and 42 through the magnetically opposed control field windings 56 and 57 of the amplidyne 12.

The biasing resistors 58 and 59 are designed so that at zero error voltage, the valves 54 and 55 are conducting approximately in mid-range and the currents conducted by the two valves are equal. As a result, the control field windings 56 and 57 are equally and oppositely energized and the output voltage of the amplidyne generator is zero. Thus, when the "error voltage" is such that a voltage appears between the terminals 49 and 50 which is positive at terminal 50, the output of the valve 55 is increased and the output of valve 54 is decreased so that a greater voltage is applied across the forward field winding 56 of the amplidyne generator 12 than that which is applied across the reference field winding 57. The amplidyne generator, therefore, has a net output voltage. For the condition described, the amplidyne generator output voltage is of a polarity to cause forward rotation of the driving motor 1. If the "error voltage" is such that the output voltage of the discriminator stage 11b is positive at the terminal 49, then the output voltage of the amplifier stage 11c will be such that a greater voltage is applied across the reverse field winding 57 than that which is applied across the forward field winding 56 and the amplidyne generator 12 has a net output voltage of a polarity to cause the motor 1 to rotate in the reverse direction. With the foregoing understanding of the elements and their organization, the operation of the system of Fig. 1 will readily be understood from the following detailed description.

As an initial operating condition, it is assumed that the reversing switch 60 in the connections between the supply terminals and the reference voltage potentiometer is in the forward position. It is also assumed that the slider 9a is in a preselected position which is calibrated to correspond to a desired speed of the motor 1 and that the motor 1 is operating at the desired speed in the forward direction. The alternating control voltage which is produced at the output terminals 10a and 10b is supplied to the voltage comparison circuit. It is not equal to the reference voltage. It must be slightly less in order that there will be supplied to the amplifier an error voltage of sufficient magnitude to cause the amplifier to supply an excitation voltage of greater magnitude to the forward field winding 56 of the amplidyne than that supplied to the reverse field winding 57 by the amount necessary to produce a net excitation of the amplidyne sufficient to cause the motor to run at the selected speed.

If the load on the motor should change, for example, if it should increase, the speed of the motor would decrease slightly, and the control voltage generated by the tachometer generator would decrease correspondingly. This would cause the error voltage to increase and thus control the amplifier to increase the current supplied to the forward field winding of the amplidyne and to decrease correspondingly the current supplied to the reverse field winding. This results in an increase in the net excitation of the amplidyne which, in turn, increases the excitation of the adjustable voltage generator and causes the generator to increase the voltage supplied to the motor thus to increase the speed of the motor. As the speed of the motor increases, the error voltage decreases. This speed-correcting operation continues until a new balanced condition of the system is reached.

In order to stabilize the system and compensate for the system time constant, an amplidyne generator feedback network 90 of a well known type is provided. The feedback network is composed of a pair of potentiometers 91 and 92, each having an end terminal connected to an opposite side of the amplidyne generator output; a pair of line capacitors 93 and 94, each connected in series with one of the potentiometer taps; and a parallel connected capacitor 95 connected between the lines in which the line capacitors 93 and 94 are connected. The output of the feedback circuit is connected directly across the plate supply of the first amplifier stage 11a and, therefore, determines the gain thereof in accordance with the output voltage of the feedback circuit. The feedback circuit 90 gives a negative rate of change feedback proportional to the rate of change of amplidyne voltage. The input to the feedback circuit 90 and hence the amount of feedback is adjusted by means of the taps on the potentiometers 91 and 92.

The system time constant is compensated by the feedback since the initial rate of change of amplidyne voltage is relatively slow when the error voltage calls for one. As a consequence, the negative feedback is low and the full system gain is utilized for forcing. As the amplidyne output voltage changes, the feedback is increased and the system gain is decreased. As the motor 1 approaches the reference speed, the output of the feedback circuit approaches steady state conditions rapidly and the gain of the amplifier approaches its normal value. From the foregoing discussion, it will be readily seen that the rate of change feedback circuit will be equally effective for either forward or reverse operation of motor 1.

Another well known type of stabilizing feedback is applied to the grid circuit of the second stage of amplification 11b. This feedback voltage is also derived from the output of the amplidyne 12 but is fed back by means of leads 96 and 97 through capacitor 98 to affect the grid bias of the tubes 45 and 46. The purpose of this feedback is also to stabilize the system and compensate for system time constant. It will readily be seen that this feedback will accomplish these results in a manner similar to that set forth with respect to the feedback circuit 90.

An advantage of this invention is that the provision of a constant frequency alternating voltage tachometer generator makes it possible to use an alternating reference voltage; i. e., the alternating output voltage of the tachometer generator may be directly subtracted from the alternating reference voltage to produce an alternating error or difference voltage. A further advantage is that the alternating error voltage makes it possible to use an alternating voltage amplifier instead of a direct voltage amplifier. An alternating voltage amplifier has stable operating characteristics whereas the operating characteristics of a direct voltage amplifier are relatively unstable.

Certain operating advantages may be obtained by connecting the coils of the stator winding of the tachometer generator to form a bridge as illustrated in Fig. 4. The diagonally opposite bridge terminals 61 and 62 constitute the input terminals of the bridge and are connected through the capacitor 27 and resistor 28 to a portion of the source transformer 7 as are the primary coils 24 and 26 in Fig. 1. The remaining diagonally opposite terminals constitute the output of the bridge and are connected to the tachometer output terminals 10a and 10b.

One advantage of this bridge connection is that inaccuracies in the output voltage which are produced by temperature variations of the generator are greatly reduced because such temperature-responsive errors as are produced in the stator cores are balanced out. Another advantage is that at zero speed of the tachometer generator, the output voltage is zero. With the coil connection illustrated in Fig. 1, leakage flux may produce a small but unwanted output voltage at zero speed.

In the modification of the invention illustrated in Fig. 2, the output voltage of the adjustable voltage generator is maintained constant at a desired value by means of a voltage regulator which is illustrated as comprising a source of direct reference voltage 63, a potentiometer 64 connected across the armature terminals of the adjustable voltage generator 2 for deriving therefrom a direct control voltage which is proportional to the armature voltage, and a magnetic amplifier 65 connected to be responsive to the difference between the control voltage and the reference voltage.

The direct reference voltage unit 63 comprises a pair of saturable reactors 66 and 67, a potentiometer 68 connected to receive the voltage output from the saturable reactors, a full-wave bridge-connected rectifier 69 connected across the active portion of the potentiometer and a resistor 70 connected across the output terminals of the rectifier.

The saturable reactors 66 and 67 are identical in construction and consequently only the reactor 66 is described in detail. It is illustrated in Fig. 6 as comprising a four-legged core member 66a, two main reactor coils 66b and 66c, two auxiliary coils 66d and 66e and a control winding 66f. On one of the inner legs of the core are mounted the main reactance coil 66b and one of the auxiliary coils 66d, and on the other inner leg are mounted the main coil 66c and the auxiliary coil 66e. The control winding 66f surrounds both central legs.

The electrical connections of these coils are illustrated in Fig. 2. Both main reactance coils 66b and 66c are connected in parallel relationship and the two auxiliary coils 66d and 66e are also connected in parallel relationship with each other, and the two sets of parallel-connected coils are connected in series relationship. The auxiliary coils 66d and 66e are poled to act as booster coils with respect to the main coils. The auxiliary coils 67d and 67e of the reactor 67 are connected in parallel and poled to buck the parallel connected main coils 67b and 67c and the set of main and auxiliary coils of both reactors are connected in series relationship with each other across the potentiometer 68. The saturable reactors 66 and 67 are supplied by the potentiometer 71 which is connected across the alternating voltage supply conductors 47 and 48. The active portion of the potentiometer 71 is connected between the terminals 74 and 75 which in turn are connected from the main winding of the two saturable reactors 66 and 67. Thus, it will readily be seen that the two saturable reactors 66 and 67 are connected in an arrangement which is commonly known as a line voltage regulator. In a sense, the two saturable reactors act as auto transformers.

When both control windings 66f and 67f conduct equal current, the cores of both reactors are equally saturated and the voltage at the output terminals 72 and 73 is equal to the voltage at the input terminals 74 and 75. This is due to the fact that the impedance of the main winding of each saturable reactor is of equal value and, therefore, the voltage supply between the terminals 74 and 75 will divide fully between the main winding. Consequently, equal voltages will be induced in the auxiliary windings of each of the reactors. Since the auxiliary windings of the saturable reactor 66 are aiding with respect to the main winding, the induced voltage therein will be additive whereas the auxiliary windings of the saturable reactor 67 are connected in such a manner that they buck the magnetic effect of the main coils of the reactor and, therefore, the voltage therein will be subtractive. Since these voltages are equal and opposite, the voltage between the terminals 72 and 73, that is, the output terminals of the saturable reactors, will be equal in magnitude to the voltage applied between the terminals 74 and 75. This output voltage is supplied to the potentiometer 68 and a selectable portion of it is rectified by the rectifier 69. This rectified voltage is supplied to the resistor 70 and it constitutes the direct reference voltage for the voltage regulator.

If the current in the control windings 67f is increased and that in the control winding 66f is decreased, the reactance of the saturable reactor 67 will be decreased and the reactance of the saturable reactor 66 will be increased. Consequently, the applied voltage between the terminals 74 and 75 will be divided unequally between the main windings of the two reactors. The division will be such that the majority of the applied voltage appears across the main windings of the saturable reactor 66. This being the case, an increased additive voltage will be induced in the auxiliary windings of the saturable reactor 66 and a reduced subtractive voltage will be induced in the auxiliary windings of the saturable reactor 67. The net result will be that the voltage across the output terminals 72 and 73 will increase and the direct reference voltage across resistor 70 will increase correspondingly.

If the current in the control winding 66f is increased and that in the control winding 67f is decreased, the applied voltage to the combination of the two saturable reactors 66 and 67 will be unequally divided with the major portion of the applied voltage appearing across the main windings of the saturable reactor 67. Thus the voltage induced in the auxiliary windings of the saturable reactor 67 will be greater than the voltage induced in the saturable reactor 66. Since the induced voltage in the saturable reactor 67 is subtractive, the net result will be a reduced voltage between the output terminals 72 and 73 of the saturable reactor devices.

The magnetic amplifier 65 comprises two saturable reactors 76 and 77. The reactor 76 has two main reactance windings 76a and 76b and the reactor 77 has two main reactance windings 77a and 77b.

A supply transformer 78 having a primary winding 78a connected to the alternating voltage supply terminals 47 and 48 and two secondary windings 78b and 78c supplies alternating voltage to the reactance windings of both reactors. As shown, the reactance coils 76a and 76b are connected from opposite terminals of the secondary winding 78b through rectifiers 79 and 80 to one terminal of the coil 56 which constitutes one-half of the main control field winding of the amplidyne 12, and from the opposite terminal of coil 56 to the center tap of secondary winding 78b. Similarly, the reactance windings 77a and 77b are connected from opposite terminals of secondary winding 78c through rectifiers 81 and 82 to one terminal of the other amplidyne field coil 57 the opposite terminal of which is connected to the center tap of secondary winding 78c. Owing to the connection of the rectifiers 79, 80, 81 and 82 in series with the reactance coils 76a, 76b, 77a and 77b, a rectified half-wave pulsating direct current flows in each of the reactance coils and a full-wave rectified direct current flows in each of the oppositely poled amplidyne field winding coils 56 and 57. The direct component of the half-wave current in each reactance coil partially saturates its core and causes each reactor, i. e., each half of the magnetic amplifier, to conduct approximately in mid-range so that the opposed amplidyne field coils 56 and 57 are equally excited and the net excitation and output voltage of the amplidyne is zero. With certain core materials having high permeability, the self-saturation produced by the rectified current in the reactance windings is of such magnitude that both paths of the magnetic amplifier conduct at a value well above mid-range. In order to reduce the current flowing in the magnetic amplifiers to mid-range in such cases, a bias winding should be provided. This bias winding if utilized may be supplied from a suitable source of direct voltage through an adjustable resistor, which voltage should be poled so that the biasing flux opposes the flux of the main reactance windings 76a, 76b, 77a and 77b.

The reactors 76 and 77 are provided with direct current saturation control windings 76c and 77c connected in series relationship with each other. The control winding 76c is poled so that its flux acts cumulatively with the flux produced by the reactance coils 76a and 76b and the control winding 77c is poled to oppose the reactance coils 77a and 77b for one direction of current flow in the control windings. For the opposite direction of flow, the control winding 77c will act cumulatively with the flux produced by the reactance windings 77a and 77b and the control winding 76c will oppose the reactance coils 76a and 76b. Thus, when current flows in the control windings in the first direction, the reactance of reactor 76 is decreased and that of reactor 77 is increased and consequently, the current supplied to the amplidyne field winding 56 is increased and the current supplied to the opposed field winding is correspondingly decreased. For the opposite direction of current in the control windings the current supplied to the amplidyne field winding 56 is decreased and the current supplied to the opposed field winding is correspondingly increased. As a result, the amplidyne is given a net excitation and, in turn, supplies exciting current to the main field winding of the adjustable voltage generator 2 causing it to generate an output voltage.

The negative terminal of the potentiometer 64 is connected to the negative terminal of the reference voltage resistor 70 and the series-connected control windings 76c and 77e are connected between their positive terminals so that an error voltage equal to the difference of the reference voltage across resistor 70 and the control voltage across potentiometer 64 is supplied to the control windings.

The voltage regulator operates as follows. By adjusting the potentiometer 71, the reference voltage across the resistor 70 is adjusted to the value which corresponds to the value at which it is desired to maintain the generator voltage. If the generator voltage is less than this desired value, the error voltage, i. e., the difference of the reference voltage and the control voltage, is increased thereby increasing the current supplied to the amplidyne field winding 56 and decreasing the current supplied to the opposing field winding 57. This increases the net excitation of the amplidyne which, in turn, effects an increase in the generator voltage. This correcting action continues until a new balanced condition of the system is reached.

The portion of the system which is combined with the voltage regulator to maintain the speed of the motor 2 constant at a preset value comprises the tachometer generator 10, an electronic amplifier 83 and the potentiometer 71 which constitutes a source of alternating reference voltage. The tachometer generator 10 is the same as the tachometer generator 10 of Fig. 1 with the exception that the bridge connection of the stator winding illustrated in Fig. 3 is used.

As shown, the electronic amplifier is an alternating voltage type amplifier and comprises two stages of which the first is a phase discriminator and voltage amplifier and the second stage is a power amplifier. The first stage is illustrated as comprising a twin triode electric valve 84 having both conducting paths enclosed within the same envelope, and the anode-cathode circuits supplied from the secondary winding of a transformer 85 of which the primary winding is supplied from the alternating voltage supply terminals 47 and 48 from which the stator windings of the tachometer generator 10 are also supplied. Likewise, the anode-cathode circuits of the second stage valves 86 and 87 are supplied from the transformer 85. These circuits are traced from the anodes of valves 86 and 87 through control windings 66f and 67f in parallel and thence by conductor 88 to one terminal of the secondary winding of transformer 85 and from the opposite terminal of the secondary winding to the cathodes of valves 86 and 87. It will be noted that the anodes of the second stage valves and the anodes of the first stage valves are connected to opposite terminals of the secondary winding and, consequently, the first and second stages conduct on opposite half cycles of the alternating voltage wave.

The first stage of the amplifier 83 is provided with an input transformer 89 of which the secondary winding is included in a voltage comparison circuit in which the tachometer generator 10 and the alternating reference voltage potentiometer 71 are connected in opposing series relationship so that the difference of the tachometer and reference voltages, i. e., the error voltage, is supplied to the input transformer.

The control electrode circuits of valves 84, 86 and 87 are biased so that with zero error voltage supplied to the input transformer the valves in both stages are conducting approximately in mid-range and both power amplifier valves 86 and 87 are conducting equal amounts of current. As a result, equal currents flow in the control windings 66f and 67f and reactors 66 and 67 are equally saturated and the output voltage of the reactor at output terminals 72 and 73 is equal to the alternating reference voltage across the active portion of the potentiometer 71.

In operation, the voltage regulator portion of the system maintains the output voltage of the adjustable voltage generator constant at a value corresponding to the magnitude of the direct reference voltage across resistor 70 and consequently corresponding to the magnitude of the alternating reference voltage as determined by the adjustment of the potentiometer 71 from which the direct reference voltage is derived.

Under steady load conditions the motor 1 operates at a speed corresponding in magnitude to the output voltage of the adjustable voltage generator 2 and, consequently, to the magnitude of the alternating reference voltage. If for any reason the speed of the motor 1 departs from the desired preselected speed, as determined by the setting of the potentiometer 71, an error voltage will appear in the voltage comparison circuit and will be applied to the primary winding of the input transformer 89. If, for example, the speed of the motor 1 decreases below the predetermined value, the error voltage will increase the current flowing in power amplifier valve 87 and decrease the current flowing in valve 86. Consequently, the saturation of reactor 67 will be increased and that of reactor 66 will be decreased. This results in an increase in the output voltage of terminals 72 and 73 thereby effecting a corresponding increase in the direct reference voltage across resistor 70. As a result, the voltage regulator will increase the voltage of the generator 2 which, in turn, will increase the speed of the motor. As the motor speed increases, the error voltage will decrease and thereby reduce the rate at which the speed of motor 2 is being restored to the preset value. This correcting action continues until a new balanced condition is reached with the speed of the motor 1 corresponding very closely to the magnitude of the alternating reference voltage which is preset upon the potentiometer 71.

Although in accordance with the provisions of the patent statutes a preferred embodiment of the invention is illustrated and described, modifications will readily suggest themselves to persons skilled in the art without departing from the true spirit of the invention or from the scope of the annexed claims.

What I claim as new and desire to secure by Letters Patent of the United States is:

1. A control system comprising in combination a source of adjustable voltage, an electric motor supplied from said source, a regulator connected to said source for maintaining the voltage of said source substantially constant and provided with adjusting means for adjusting the value at which said source of adjustable voltage is maintained, a pair of alternating voltage terminals, connections for deriving from said terminals an alternating reference voltage, an alternating voltage tachometer generator driven by said motor having a winding energized from said alternating voltage terminals for producing a control voltage varying in magnitude with the speed of said motor and having a frequency remaining unchanged by variations in the speed of said motor, and an alternating voltage amplifier having input connections to said reference voltage deriving connections and said tachometer generator and having output connections to said regulator adjusting means for causing said regulator to vary the voltage of said source of adjustable voltage to effect operation of said motor at a speed corresponding to the magnitude of said reference voltage.

2. A control system comprising in combination a source of direct adjustable supply voltage, an electric motor supplied from said source, a voltage regulator for said source comprising a source of direct reference voltage which source of direct reference voltage is provided with voltage adjusting means and an amplifier, means for deriving a direct control voltage from said supply voltage source which is a function thereof, said amplifier being connected to be responsive to the difference of said direct reference voltage and said direct control voltage for controlling the voltage of said direct adjustable supply voltage source, a pair of alternating voltage terminals, connections for deriving from said terminals an alternating reference voltage, an alternating voltage tachometer generator driven by said motor and having a winding energized from said terminals for producing an alternating control voltage varying in magnitude with the speed of said motor and having a frequency remaining constant for all speeds of said motor, and an alternating voltage amplifier having input connections to said alternating reference voltage connections and to said tachometer generator and having output connections to said regulator voltage adjusting means for varying the voltage of said supply source to effect operation of said motor at a speed corresponding to the magnitude of said alternating reference voltage.

3. A control system comprising in combination a source of direct adjustable supply voltage, an electric motor supplied from said source, a pair of alternating voltage terminals, a voltage regulator for said source of direct adjustable supply voltage, said voltage regulator comprising means for driving a direct control voltage from said direct adjustable supply source, a source of adjustable direct reference voltage and an amplifier connected to be responsive to the difference of said direct reference voltage and said direct control voltage for controlling the voltage of said direct adjustable supply voltage source, said source of direct reference voltage comprising a saturable reactance device having at least one reactance winding and at least one control winding, an adjustable potentiometer connected across output terminals of said saturable reactance device, and a full wave rectifier having input terminals connected across a selected portion of said potentiometer and output terminals connected to supply said direct reference voltage, an adjustable reference potentiometer connected across said alternating voltage terminals and providing a source of alternating reference voltage, said saturable reactance device being connected to be energized by said alternating reference voltage, an alternating voltage tachometer generator driven by said motor and having a stator winding connected to said alternating voltage terminals to be energized therefrom for producing an alternating control voltage varying in magnitude with the speed of said motor and having a frequency remaining constant for all speeds of said motor, an alternating voltage amplifier having input connections to said adjustable reference potentiometer and to said tachometer generator and having output connections to said control winding of said saturable reactor for varying said direct reference voltage thereby to vary the voltage of said direct adjustable supply voltage source to effect operation of said motor at a speed corresponding to the magnitude of said alternating reference voltage.

4. A motor control system comprising a source of adjustable voltage, an electric motor supplied from said source, voltage error determining means for determining the difference between the voltage of said source of adjustable voltage and the desired voltage, speed error determining means for determining the difference between the speed of said electric motor and the desired speed, a voltage regulator connected to determine the magnitude of the voltage of said source of adjustable voltage, means to mix the voltage error as determined by said voltage error determining means and the speed error as determined by said speed error determining means in said voltage regulator to determine the voltage of said source of adjustable voltage and the speed of said electric motor in response thereto.

References Cited in the file of this patent
UNITED STATES PATENTS

| | | |
|---|---|---|
| 2,115,086 | Riggs | Apr. 26, 1938 |
| 2,466,756 | White | Apr. 12, 1949 |
| 2,503,346 | Meredith | Apr. 11, 1950 |
| 2,519,339 | Avery | Aug. 22, 1950 |
| 2,528,467 | Bulliet | Oct. 31, 1950 |
| 2,594,015 | Halter | Apr. 22, 1952 |
| 2,605,452 | Ney et al. | July 29, 1952 |
| 2,632,139 | Bloodworth | Mar. 17, 1953 |
| 2,677,085 | Sikorra | Apr. 27, 1954 |